United States Patent
D'Souza et al.

(10) Patent No.: US 12,093,113 B2
(45) Date of Patent: Sep. 17, 2024

(54) COMMUNICATING A DESIRED POWER STATE TO A POWER STAGE FROM A PHASE CONTROLLER IN A POWER SUPPLY

(71) Applicant: Shaoxing Yuanfang Semiconductor Co., Ltd., Shaoxing (CN)

(72) Inventors: Arnold J D'Souza, Bangalore (IN); Shyam Somayajula, Bangalore (IN)

(73) Assignee: Shaoxing Yuanfang Semiconductor Co., Ltd., Zhejiang (CN)

( * ) Notice: Subject to any disclaimer, the term of this patent is extended or adjusted under 35 U.S.C. 154(b) by 0 days.

(21) Appl. No.: 18/161,102

(22) Filed: Jan. 30, 2023

(65) Prior Publication Data

US 2024/0028104 A1   Jan. 25, 2024

(30) Foreign Application Priority Data

Jul. 25, 2022  (IN) .............................. 202241042554

(51) Int. Cl.
*G06F 1/3287* (2019.01)
*G06F 1/3296* (2019.01)

(52) U.S. Cl.
CPC .......... *G06F 1/3287* (2013.01); *G06F 1/3296* (2013.01)

(58) Field of Classification Search
CPC .... G06F 1/3287; G06F 1/3293; G06F 1/3296; G06F 1/3203; G06F 1/3234
See application file for complete search history.

(56) References Cited

U.S. PATENT DOCUMENTS

| | | | |
|---|---|---|---|
| 6,873,136 B2 | 3/2005 | Chagny | |
| 8,850,241 B2 | 9/2014 | Oler | |
| 9,703,367 B2 * | 7/2017 | Atkinson | ............... G06F 1/3296 |

(Continued)

FOREIGN PATENT DOCUMENTS

| | | |
|---|---|---|
| CN | 101727170 A | 6/2010 |
| CN | 101770271 A | 7/2010 |

(Continued)

OTHER PUBLICATIONS

Multi-Phase Buck Controller with PWM_VID and I2C Interface, Jul. 2020, 31 pages, USA.

(Continued)

*Primary Examiner* — Raymond N Phan
(74) *Attorney, Agent, or Firm* — IPHORIZONS PLLC; Narendra Reddy Thappeta (57) ABSTRACT

The present disclosure is directed to a power supply to drive a consumer component, which is operable in any one of multiple power states in a specified duration. The power supply contains a phase controller and power stage, to together drive the consumer component to a desired power state in a corresponding duration. According to an aspect, the phase controller includes a pin, an impedance network and an internal controller. The impedance network is configurable by the internal controller to provide a first impedance at the pin when the desired power state is a first power state and a second impedance when the desired power state is a second power state. Accordingly, the power stage may source an electrical signal to the pin and sense the response to determine whether the desired power state is the first or the second power state.

20 Claims, 6 Drawing Sheets

(56) References Cited

U.S. PATENT DOCUMENTS

| | | | | |
|---|---|---|---|---|
| 9,843,252 B1* | 12/2017 | Chang | ............... | H02M 1/36 |
| 2009/0267578 A1* | 10/2009 | Luo | ............... | H02J 1/102 |
| | | | | 323/272 |
| 2010/0191986 A1 | 7/2010 | Su | | |
| 2012/0080945 A1 | 4/2012 | Vasadi et al. | | |
| 2012/0086418 A1* | 4/2012 | Lee | ............... | H02M 3/1584 |
| | | | | 323/272 |
| 2014/0197810 A1* | 7/2014 | Huang | ............... | G05F 1/468 |
| | | | | 323/272 |
| 2018/0302077 A1* | 10/2018 | Navarro Castillo | ..... | H03K 7/08 |

FOREIGN PATENT DOCUMENTS

| | | |
|---|---|---|
| CN | 104362854 A | 2/2015 |
| CN | 105027407 A | 11/2015 |
| CN | 107819395 A | 3/2018 |
| CN | 207490761 U | 6/2018 |
| TW | 201520750 A | 6/2015 |

OTHER PUBLICATIONS

Dual Output Digital Multi-Phase Controller, Feb. 8, 2015, 60 pages, USA.

Tom Urkin, Development and ic implementation of multi-mode controllers for high performance voltage regulation, Thesis, Sep. 2019, 109 pages, Ben-Gurion University of the Negev.

Carmen Parisi, Multiphase Buck Design From Start to Finish, Apr. 2021, 19 pages, Dallas, Texas.

CSD95372AQ5M Synchronous Buck NexFET™ Power Stage, Mar. 2015, 25 pages, Dallas, Texas.

International Search Report dated Dec. 4, 2023, for PCT Application No. PCT/IN2023/050712, filed on Jul. 23, 2023, 5 pages.

Written Opinion of the International Searching Authority dated Dec. 4, 2023, for PCT Application No. PCT/IN2023/050712, filed on Jul. 23, 2023, 8 pages.

* cited by examiner

COMMUNICATING A DESIRED POWER STATE TO A POWER STAGE FROM A PHASE CONTROLLER IN A POWER SUPPLY

RELATED APPLICATIONS

The instant application is related to co-pending U.S. patent application Ser. No. 18/055,839, entitled "Emulating Current Flowing Through an Inductor Driven by a Combination of High Side Switch and a Low Side Switch in a Switching Converter", inventors Arnold D'Souza, et al, Filed: 16 Nov. 2022; which is incorporated in its entirety herewith.

PRIORITY CLAIM

The instant patent application is related to and claims priority from the co-pending India provisional patent application entitled, "PS3 Mode Detection", Serial No.: 202241042554, Filed: 25 Jul. 2022, which is incorporated in its entirety herewith to the extent not inconsistent with the description herein.

BACKGROUND

Technical Field

Embodiments of the present disclosure relate generally to voltage regulators, and more specifically to implementation of a power stage in a multi-phase voltage regulator.

Related Art

A voltage regulator refers to a component that generates a regulated DC (direct current) voltage from an input supply voltage, as is well known in the relevant arts. Voltage regulators find use in several devices/systems such as computers, mobile phone, etc.

A voltage regulator often employs multiple power stages, which together generate the regulated DC voltage. Each power stage generates a corresponding part of the requisite load current in a respective phase of a sequence of phases, and thus such a voltage regulator is referred to as a multiphase voltage regulator.

Aspects of the present disclosure are directed to implementation of a power stage in a multi-phase voltage regulator.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

The present disclosure is directed to a power supply to drive a consumer component, which is operable in any one of multiple power states in a specified duration. The power supply contains a phase controller and power stage, to together drive the consumer component to a desired power state in a corresponding duration. The phase controller controls the power stage to cause the power stage to drive the consumer component to the desired power state.

According to an aspect, the phase controller includes a pin, an impedance network and an internal controller. The impedance network is configurable by the internal controller to provide a first impedance at the pin when the desired power state is a first power state and a second impedance when the desired power state is a second power state. Accordingly, the power stage may source an electrical signal to the pin and sense the response to determine whether the desired power state is the first power state or the second power state.

In an embodiment, the impedance network includes multiple resistors having different magnitude of resistances and corresponding switches with each switch designed to couple one of the resistors to the pin. The internal controller operates the switches to couple one of the resistors to the pin to indicate the corresponding specific one of power states being provided as the desired power state. The power stage may accordingly apply a current on the pin and sense the corresponding response voltage to determine the desired power state in that duration.

According to yet another aspect of the present disclosure, the power stage determines the desired power state as the second power state when the sensed voltage exceeds a predetermined threshold, and as first power state otherwise. In an embodiment, the power states include at least four states including a highest power state, a high-power state, a low-power state and a shut down power state in decreasing order of power levels, the first power state being the high-power state and the second power state being the low-power state.

Several aspects of the present disclosure are described below with reference to examples for illustration. However, one skilled in the relevant art will recognize that the disclosure can be practiced without one or more of the specific details or with other methods, components, materials and so forth. In other instances, well known structures, materials, or operations are not shown in detail to avoid obscuring the features of the disclosure. Furthermore, the features/aspects described can be practiced in various combinations, though only some of the combinations are described herein for conciseness.

2. Example System

Figure 1:
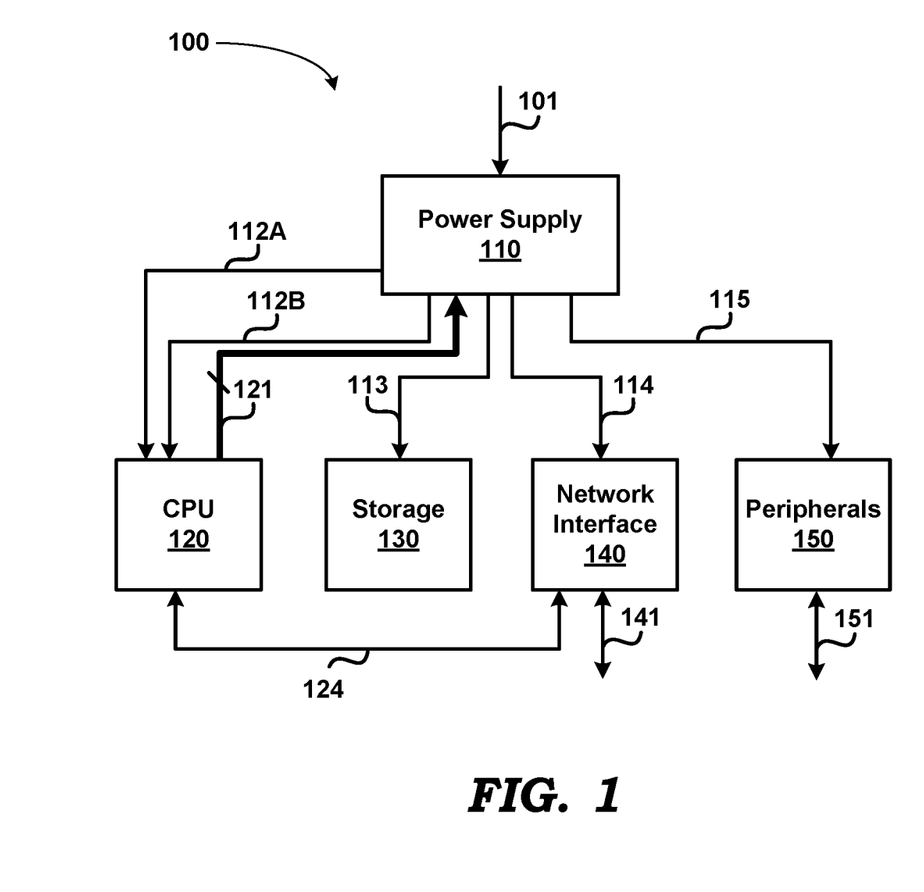
FIG. 1 is a block diagram of an example system in which several aspects of the present disclosure can be implemented.

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1.

CPU 120, in general, represents a processor or a system-on-chip (SoC), and is shown as receiving a pair of supply voltages (Va and Vb) on respective paths 112A and 112B from power supply 110. As an example, Va may be a smaller voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific power state (in terms of power consumption) such as PS0, PS1, PS1, PS2, PS3 and PS4, which refer to power-save states for improved efficiency. Each of CPU 120, storage 130, network interface 140 and peripherals 150 accordingly represents a consumer component in the illustrative embodiment that is supplied the requisite load current from power supply 110.

Storage 130 represents a memory that may include one or both of volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provide two-way communication between system 100 and a computer network, or in general internet. Network controller 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 receives from/transmit to external systems and CPU 120 respectively on path 141 and path 124.

Peripherals 150 represents one or more peripheral circuits, such as for example, speakers, microphones, user interface devices, etc. Peripherals 150 receives a power supply on path 115, and communicates with external devices on path 151.

Power supply 110 receives one or more sources of power (e.g., battery) on path 101, and operates to provide the desired power supply voltages on paths 112A, 112B, 113, 114 and 115. In an embodiment, power supply 110 is designed to contain one or more DC-DC converters (power stages) within to generate the power supply voltages. Power supply 110 responds to signals from CPU 120 received on path 121 to control the power stages to reduce/increase current output based on the specific signal (e.g., PS0, PS1, PS2, PS3 and PS4).

In the embodiment, power supply 110 is a multi-phase voltage regulator, sometimes also called processor power module (PPM), and contains one or more power stages to generate several smaller voltages from a higher-voltage supply source. In other embodiments however, other types of DC-DC converters such as boost, buck-boost, hysteretic converters etc., may be employed without departing from the scope and spirit of several aspects of the present disclosure. With a multi-phase voltage regulator, multiple devices/ICs requiring different supply voltages can be mounted on the same platform, for example, a computer motherboard of a personal computer (PC). Accordingly, the description is continued with respect to a multi-phase voltage regulator as shown in FIG. 2A.

3. Multi-Phase Voltage Regulator

Figure 2A:
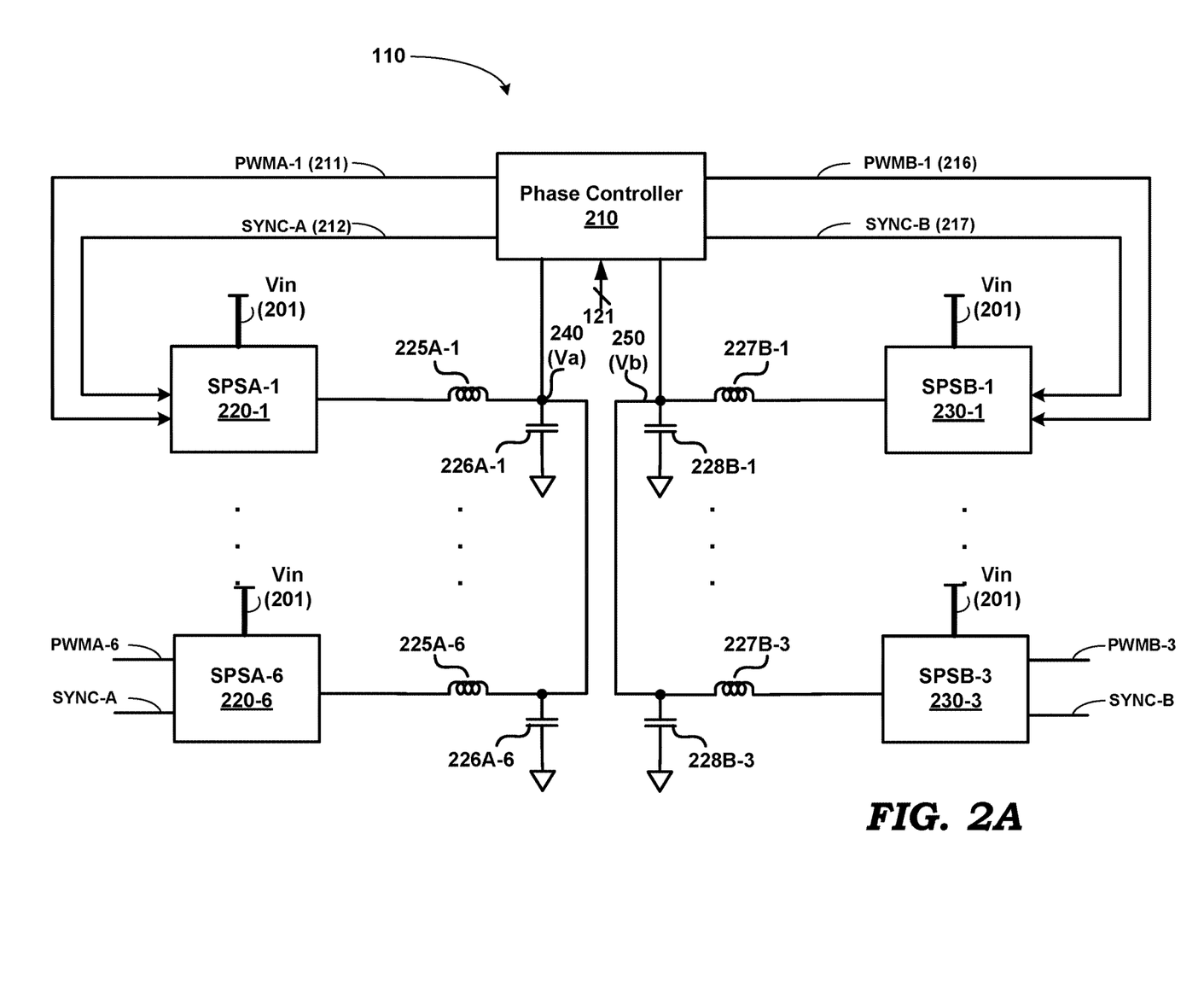
FIG. 2A is a block diagram of a multi-phase voltage regulator implemented in an embodiment of the present disclosure.

FIG. 2A is a block diagram illustrating the details of a multi-phase voltage regulator in an embodiment of the present disclosure. Power Supply/Voltage regulator 110 of FIG. 2A is shown containing phase controller 210, power stages SPSA-1 (220-1) through SPSA-6 (220-6), SPSB-1 (230-1) through SP SB-3 (230-3), inductors 225A-1 through 225A-6, and 227B-1 through 227B-3 and capacitors 226A-1 through 226A-6, and 228B-1 through 228B-3. Power supply Va (240) is generated by a 6-phase buck converter (there are six SPSes—220-1 through 220-6), while power supply Vb (250) is generated by a 3-phase buck converter (there are three SPSes—230-1 through 230-3). Nodes/paths 240 and 250 correspond to paths 112A and 112B of FIG. 1. In the interest of conciseness, other power supply circuits that generate supplies on paths 113, 114 and 115 are not shown in FIG. 2A. Power stages 220-1 through 220-6, 230-1 through 230-3 are collectively or individually referred by respective referral numerals 220 and 230, as will be clear from the context.

Phase controller 210 performs regulating functions to enable the generation of regulated voltages Va and Vb. Accordingly, Va and Vb are shown as being provided as inputs to phase controller 210, to enable operation of a feedback loop within phase controller 210 to regulate Va and Vb. Phase controller 210 also receives inductor-current information (current flowing through each of the inductors) from each of the SPS to enable various operations such as current-mode control of voltage regulation, current limiting, short circuit protection, and balancing the currents generated by each SPS of a same converter so as to make the currents from each SPS of a converter to be substantially equal in magnitude.

The combination of (corresponding circuitry within) phase controller 210, an SPS, an inductor and a capacitor forms (and operates in) one "phase" of each multi-phase voltage regulator. Thus, for example, SPSA-1, inductor 225A-1, capacitor 226A-1, and the corresponding portion within phase controller 210 form a single buck converter, and one 'phase' of the 6-phase voltage regulator. It is noted here that, while each phase is shown as having its own separate capacitor (e.g., 226A-1), in another embodiment, only a single larger capacitor (larger capacitance) may be employed at node 240 (as well as 250).

In an embodiment, each power stage is implemented as a smart power stage (SPS). As is well known in the relevant arts, a smart power stage may be designed to provide current and temperature information to phase controller 210 in order to enable phase controller 210 to configure distribution of load current amongst the different phases of multi-phase voltage regulator 110. Terms 'power stage' and 'SPS' are used interchangeably hereinafter in the present disclosure to refer to components 220/230.

Each SPS may be implemented to contain at least a high-side switch, a low-side switch, and gate-drive circuitry for the two switches. Additionally, each SPS may be implemented to also contain an internal block with corresponding components/sub-blocks including, such as for example some portions of phase controller 210, or for performing operations such as temperature/current monitoring, inductor current emulation, etc. Each switch is typically implemented as a transistor (e.g., MOSFET) and the switches are connected in series between input supply voltage and a reference terminal (e.g., ground). Each SPS receives a source of power as an input which is connected to the high-side switch (not shown). In FIG. 2A, the supply source is numbered 201, and has a voltage Vin. Typical value of Vin in a VRM is about 21 Volts (V).

Each SPS communicates with phase controller 210 via corresponding signals PWM and SYNC. Thus, SPSA-1 is shown connected to phase controller 210 through signal/paths PWMA-1 (211) and SYNC-A (212). SPSA-6 communicates with phase controller 210 via signals PWMA-6 and SYNC-A. Similarly, SPSB-1 is shown connected to phase controller 210 through signal/paths PWMB-1 (216) and SYNC-B (217). SPSB-3 communicates with phase controller 210 via signals PWMB-3 and SYNC-B. The other SPSes would have similar connections with phase controller 210. Only those communication paths/signals as relevant to the disclosure have been depicted in FIG. 2A. There may be more paths/signals (such as for communication of temperature information, current information, etc.) between phase controller 210 and each SPS, as will be apparent to a skilled practitioner.

Signal PWM is an input to an SPS and provides a pulse-width modulated (PWM) signal, which may, for example, be a binary signal of fixed frequency. The PWM signal controls the opening and closing of high-side switch and low-side switch of the phase. The duty cycle of the PWM signal is set by phase controller 210 and is designed to generate the desired power supply voltage and/or control/change the current supplied by that phase. For example, PWMA-1 would have a duty cycle as required for the magnitude of Va and the current to be provided by SPSA-1. As is well known in the relevant arts, the PWM signals to each SPS of a same converter are staggered, i.e., delayed with respect to each other in phase such that typically no two high-side switches or low-side switches in the converter (i.e., respective SPSes) will be overlapping. Such a technique is employed to ensure that the peak instantaneous current drawing from Vin (201) is relatively low (or zero) at all times.

In an embodiment, signal PWM represents a signal that may be of a fixed frequency but variable duty-cycle. Additionally, or optionally, the fixed frequency is potentially modifiable by phase controller 210 based on several considerations, including load-current demands. When logic LOW is detected by the SPS on signal PWM, the low-side switch is turned ON, and when logic HIGH is detected on signal PWM, the high-side switch is turned ON. A high-impedance (hi-Z) value can also be detected on signal PWM. Each SPS may employ a voltage-divider network at its PWM input pin, and a voltage output of the network substantially mid-way between logic high and logic low levels indicate a hi-Z level. Logic HIGH and logic LOW levels at the PWM input drive/pull the output of the voltage-divider network to logic high and logic low voltage levels respectively. A high-impedance (hi-Z) value on signal PWM is designed to turn OFF both the high-side and the low-side switches of the corresponding SPS. In other words, the SPS ceases to supply any output current when it detects a high-impedance value on PWM signal for a time period greater than a predetermined threshold (hold-off time, $T_h$).

Signal SYNC is an input to an SPS and may be used by phase controller 210 for the purposes of waking-up the SPS upon power-up of power supply 110, and to indicate the power state (e.g., PS2, PS3), i.e., output current requirement, of the multi-phase voltage regulator. Typically, all SPSes of a multi-phase voltage regulator share a single SYNC signal.

As noted above, each SPS receives a corresponding PWM signal and a SYNC signal to enable the SPS to drive a consumer component (e.g., CPU 120) to the desired power state. The various power states in which the consumer component can be driven, in an embodiment of the present disclosure, are described next.

4. Power States

Figure 2B:
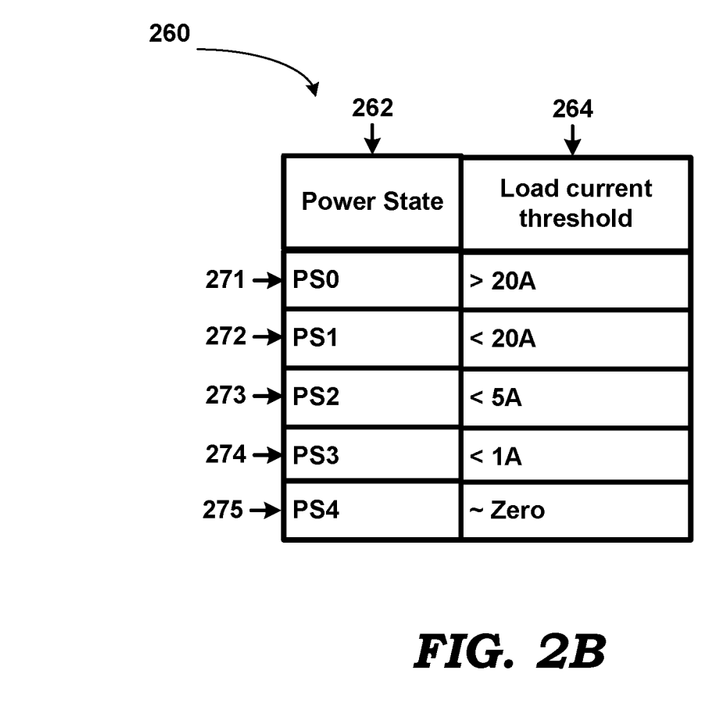
FIG. 2B depicts various power states in which a consumer component is operable in an embodiment of the present disclosure.

FIG. 2B depicts various power states in which a consumer component (e.g., CPU 120) is operable in an embodiment of the present disclosure. It is noted herein that the values depicted in table 260 of FIG. 2 are merely for illustration; load current thresholds may vary for different systems and environments. Specifically, table 260 is shown containing 5 rows (rows 271-275). Column "Power State" specifies the name of the power state. Column "Load Current Threshold" specifies the threshold of the load current value in Amperes (A) required by the consumer component in the corresponding power state. Thus, for example, if the desired power state is PS0, then it indicates that CPU 120 has a current requirement of more than 20 A, limited to the maximum allowable current supply of multi-phase voltage regulator 110.

Although table 260 is shown containing 5 power states, there may be more or fewer number of power states than those depicted in FIG. 2B, as will be apparent to a skilled practitioner. Also, the load current thresholds for respective power states may be different than those depicted in table 260, depending on the design of the consumer component and the multi-phase voltage regulator. Power states PS0 (row 271) to PS4 (row 275) represent the power states in decreasing order of power requirement.

The manner in which a power stage may operate based on the identified power state is described below with examples.

5. Flow-Chart

Figure 3:
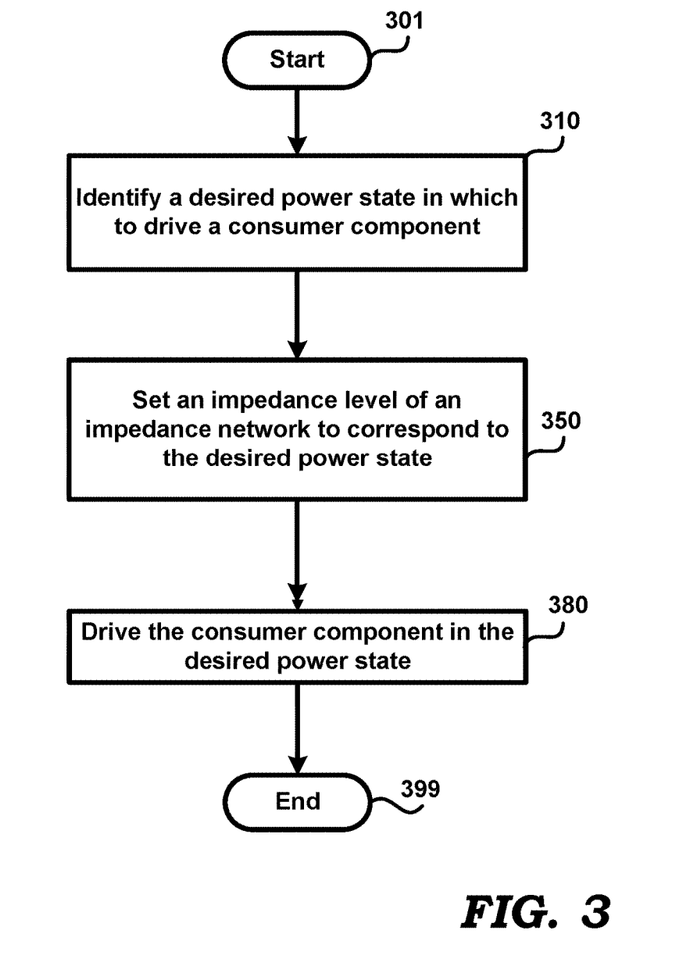
FIG. 3 is a flowchart illustrating the manner in which a consumer component is driven in a desired power state, according to an aspect of the present disclosure.

FIG. 3 is a flowchart illustrating the manner in which a consumer component is driven in a desired power state, according to an aspect of the present disclosure. The flowchart is described with respect to the components of FIGS. 1 and 2A merely for illustration. However, many of the features can be implemented in other systems and/or other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flowchart begins in step 301, in which control immediately passes to step 310.

In step 310, phase controller 210 identifies a desired power state in which to drive consumer component 120. The desired power state may be identified by phase controller 210 based on signals on path 121 noted above.

In step 350, phase controller 210 sets an impedance level of an impedance network to correspond to the desired power state. Any component may then determine the impedance level to identify the desired power state with which consumer component 120 will be henceforth driven in. Such determination may be performed by applying a desired current and examining the resultant voltage as described in embodiments below, though alternative techniques can be employed without departing from the scope and spirit of the present disclosure as will be apparent to one skilled in the relevant arts.

In step 380, phase controller 210 drives consumer component 120 in the desired power state by sending corresponding PWM and SYNC signals to SPSes 220/230. The flow-chart ends in step 399.

Thus, the flowchart of FIG. 3 operates to drive a consumer component in a desired power state. The description is continued with respect to an example technique by which power stage 220 determines whether or not an operative power state is low-power state or not.

6. Phase Controller

Figure 4:
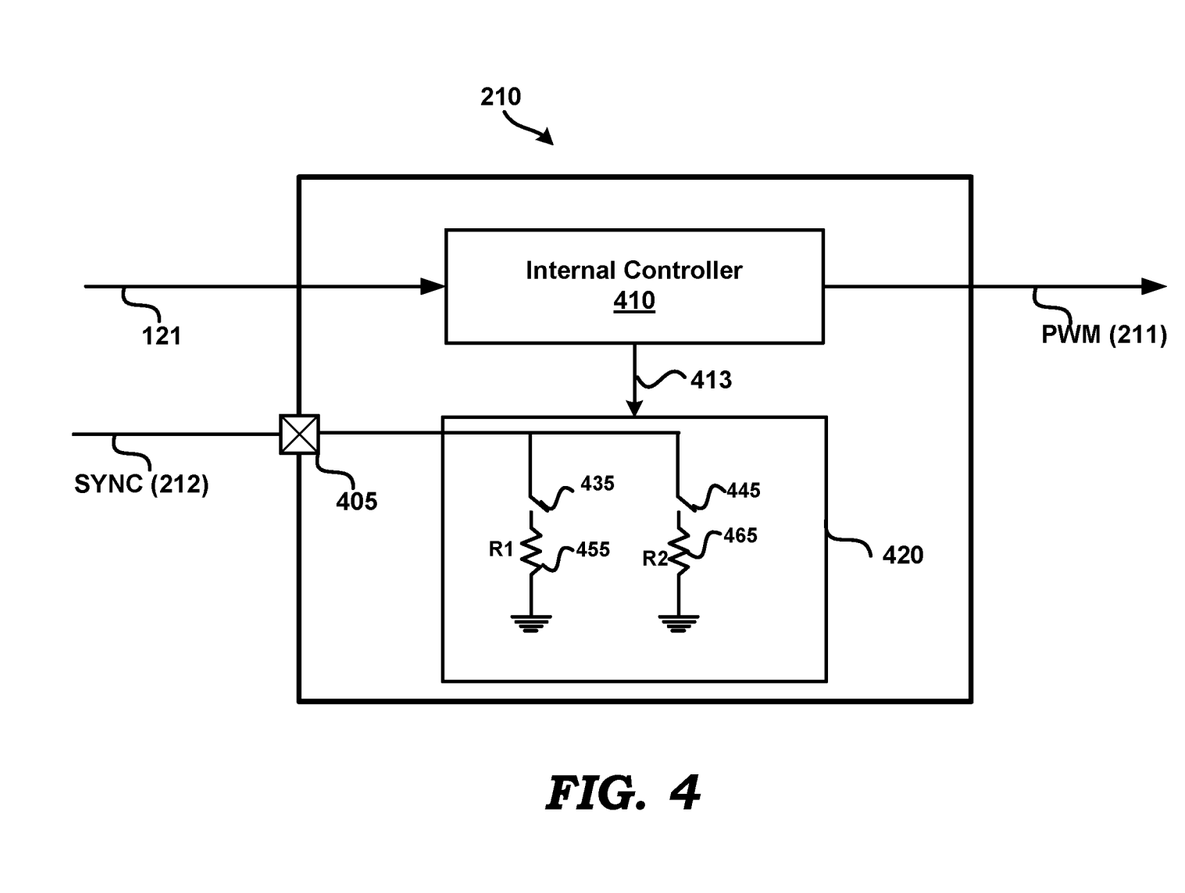
FIG. 4 is a block diagram of a phase controller implemented in an embodiment of the present disclosure.

FIG. 4 is a block diagram illustrating the implementation details of phase controller 210 in an embodiment of the present disclosure. Phase controller 210 is shown containing internal controller 410, pin 405 and impedance network 420. Impedance network 420 in turn is shown containing switches 435 and 445, and resistors 455 (having resistance value of R1) and 465 (having resistance value of R2). Only some of the components, input and output signals and pins, as relevant to the disclosure, are shown in FIG. 4 for conciseness. There will be many more components and input/output signals (some of which have been identified above) contained in phase controller 210, as will be apparent to a skilled practitioner.

Impedance network 420 operates to connect a specific one of resistances R1 and R2 to pin 405, depending on the state of switches 435 and 445. Specifically, when only switch 435 is closed (switch 445 being open), impedance network 420 provides resistance R1, and when only switch 445 is closed (switch 435 being open), impedance network 420 provides resistance R2, at pin 405. In an embodiment, R1 has a magnitude of 100-ohms and R2 has a magnitude of 25 kilo-ohms, although other magnitudes of resistances may be used, as will be apparent to a skilled practitioner by reading the disclosure herein.

Internal controller 410 receives signals from CPU 120 on path 121 and determines the desired power state based on signal 121. Internal controller 410 operates to configure impedance network 420 (by providing signals on path 413, actual connections not shown for conciseness) to provide either resistance R1 or R2 between node 405 and ground to reflect the desired power state. Internal controller 410 is also shown providing control signal PWM (211) to control the operation of high and low-side switches in the corresponding one(s) of operational power stage(s) of FIG. 2A.

In an embodiment, when internal controller 410 determines that the desired power state is PS2 (of table 260), internal controller 410 operates to close switch 435 to provide resistance R1, and opens switch 445. When internal controller 410 determines that the desired power state is PS3 (of table 260), internal controller 410 operates to close switch 445 to provide resistance R2, and opens switch 435. Thus, in power states PS2 and PS3, pin 405 is pulled to logic LOW via resistors R1 and R2. Although the description is continued with respect to resistors, aspects of the present disclosure are equally applicable to other components (such as capacitor and inductor) providing impedance, with corresponding changes in phase controller 210, as will be apparent to a skilled practitioner by reading the disclosure herein. In alternative embodiments, for identifying power states other than PS2 and PS3 noted above, a similar approach of switch-and-resistor combination may be employed with progressively varying magnitude ranges of corresponding resistance values, as will be apparent to one skilled in the relevant arts by reading the disclosure provided herein.

Internal controller 410 operates to control the power stages to reduce/increase current output based on the specific signal indicative of a desired power state (e.g., PS0, PS1, PS2, PS3 and PS4) and other considerations such as current requirements of the load, etc. Specifically, internal controller 410 may disable one or more of power stages 220 contained in multi-phase voltage regulator when the current requirement of CPU 120 reduces from a previous value, and may enable power stage(s) 220 when the current requirement of CPU 120 increases from a previous value.

In an embodiment, when internal controller 410 receives a signal from CPU 120 on path 121 indicating the desired power state as power state PS0 (e.g., when CPU 120 is running a graphics application), phase controller 210 may employ all 6 power stages (SPS 220-1 through SPS 220-6) of the 6-phase buck converter (with corresponding distribution of current output from each power stage) in order to supply the corresponding load current to CPU 120 at node Va (240). In power states PS1 through PS3, internal controller 410 may employ fewer than 6 power stages to supply the current requirement of CPU 120. Although the description is continued with respect to 6-phase converter of FIG. 2A, similar techniques will be applicable for other number of phases, such as the 3-phase converter of FIG. 2A, as will be apparent to a skilled practitioner by reading the disclosure herein.

In an embodiment, when the desired power state is PS3, internal controller 410 employs only 1 power stage to supply power to consumer component 120 since the load current is small (less than 1 A, as depicted in table 260 of FIG. 2B). Typically, in power states PS0 and PS1, any power savings may be implemented only in phase controller 210 in a known manner with the operative SPSes playing no role in power saving. In the case of power state PS3, however, since there is only 1 power stage that is operative, additional power savings in the power supply may be enabled by communicating the lower power state to the operative SPS, and the SPS reducing power consumption based on such communication. Also, since the consumer component (e.g., CPU 120) predominantly operates in PS3 mode, it is desirable to reduce the power consumption in PS3 mode.

The implementation details of a power stage that identifies a desired low-power state in an embodiment of the present disclosure are provided next.

7. Power Stage

Figure 5:
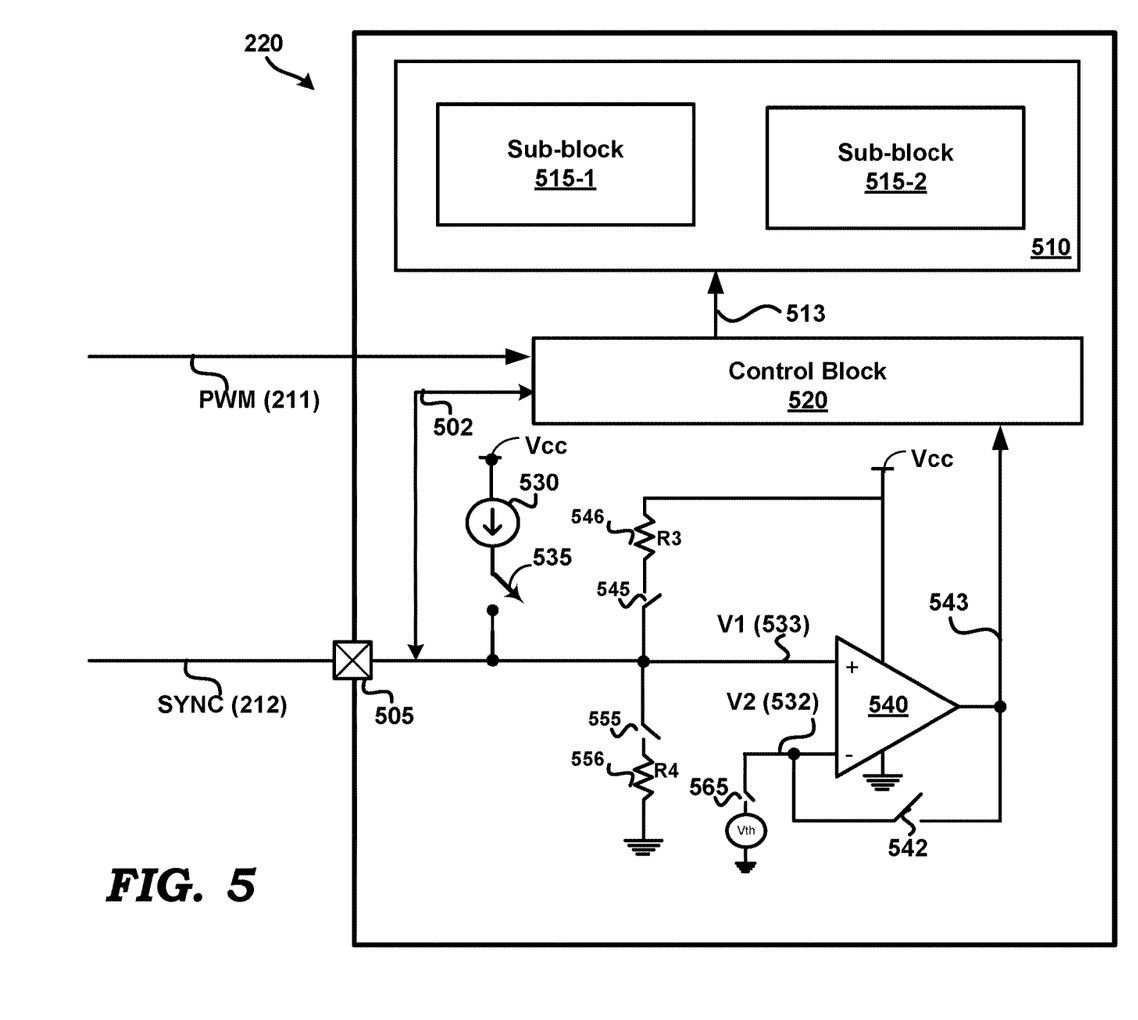
FIG. 5 is a block diagram depicting some sections, including a pin interface section, of a power stage implemented in an embodiment of the present disclosure.

FIG. 5 is a block diagram depicting some sections, including a pin interface section, of a power stage implemented in an embodiment of the present disclosure. Power stage 220 is shown containing pin 505 (connecting signal path 212 to pin 405 of phase controller 210), internal block 510, control block 520, current source 530, switches 535, 545, 555 and 565, resistors 546 (R3) and 556 (R4), and comparator 540. Internal block 510 in turn is shown containing sub-blocks (or circuit portions in general) 515-1 and 515-2. Vcc represents a power supply voltage, and can be for example around 3.3V in an embodiment. Only some of the components, input and output signals and pins, as relevant to the disclosure, are shown in FIG. 5 for conciseness. The details of remaining components are described in U.S. application Ser. No. 18/055,839, filed: 16 Nov. 2022, entitled "Emulating Current Flowing Through an Inductor Driven by a Combination of High Side Switch and a Low Side Switch in a Switching Converter", and assigned to the assignee of the present application, the contents of which are incorporated herein by reference in its entirety. Sub-blocks 515-1 and 515-2 are collectively or individually referred by referral numeral 515, as will be clear from the context.

Each of sub-blocks 515-1 and 515-2 represents circuitry that are contained in SPS in addition to the high-side switch, low-side switch and gate-drive circuitry. Sub-blocks 515-1 and 515-2 represent circuit portions at least some of which can be powered-OFF even if the SPS is operating to provide the corresponding output voltage (e.g., Va in FIG. 2). Merely for illustration, some examples of the circuit portions can implement some operations of phase controller 210, and/or designed to perform operations such as monitoring of certain parameters (such as temperature/current), fault detection and/or fault correction, etc. Only 2 sub-blocks have been depicted in internal block 510 merely for ease of illustration. Internal block 510 may contain more or fewer sub-blocks than those shown in FIG. 5, as will be apparent to a skilled practitioner by reading the disclosure provided herein.

Current source 530 represents a constant current source that sources a current through pin 505 and into SYNC (212) when switch 535 is closed. In an embodiment, the magnitude of current provided by current source 530 is 10 micro-Amperes, although other magnitudes of current can be employed as well, as will be apparent to a skilled practitioner by reading the disclosure provided herein. The magnitude of current may be designed such that the state of SYNC pin (212) is not changed when the current is sourced through SYNC pin (212). Typically, in environments similar to the one described in the illustrative embodiment, the magnitude of current is designed such that it corresponds to a voltage threshold (used to determine the desired power state, and explained in further detail below) under 150 mV.

Comparator 540 is shown receiving voltage V1 (533) on positive (+) terminal and voltage V2 (532) on negative (−) terminal. During normal operation of comparator 540, switches 545, 555 and 542 are open, and switches 535 and 565 are closed (operation is further described below). When signal received on path 212 (SYNC) is logic LOW, voltage V1 corresponds to the voltage sensed at pin 505 and voltage V2 corresponds to a predetermined threshold voltage (Vth) used to determine the desired power state. Threshold voltage (Vth) may be a value read from a register configured at design time of power stage 220. In an embodiment, the value of threshold voltage (Vth) is 150 milli-V (mV). When voltage V1 (533) exceeds voltage V2 (532), comparator 540 generates logic HIGH on path 543. When voltage V1 (533) is less than voltage V2 (532), comparator 540 generates logic LOW on path 543.

Resistors R3 (546) and R4 (556) and switches 545, 555 and 542 operate to properly terminate inputs of comparator 540 when comparator 540 is not required to operated. One example when comparator 540 is unused is when signal on path 212 is not logic LOW. When comparator 540 is not required for operation, switches 545, 555 and 542 are closed, and minimizes unnecessary power consumption in comparator 540.

Control block 520 receives signal PWM on path 211, and controls the opening and closing of high-side switch (not shown) and low-side switch (not shown) of power stage 220 based on signal PWM. If signal PWM stays in hi-Z (high-impedance) state for more than a hold-off time ($T_h$), control block 520 turns OFF both high-side and low-side switches.

SYNC signal 212 is pulsed to logic HIGH once by phase controller 210 upon reset or power-up of power supply 110 to 'wake up' the SPSes in the power supply. Thereafter, SYNC 212 is used to communicate the desired power state to SPSes by phase controller 210, as further described below.

Control block 520 reads signal SYNC on path 212 (from phase controller 220) via pin 505, on path 502. In an embodiment, control block 520 closes switches 535 and 565 and opens switches 545, 542 and 555 for a brief period when logic LOW is sensed on path 212 and PWM signal is not in hi-Z (i.e., PWM signal is toggling between logic HIGH and logic LOW). Control block 520 receives the output of comparator 540 on path 543. As further described below, control block 520 powers OFF one or more of sub-blocks 515 to obtain additional power savings depending on the logic level of signal 543. As an example, control block operates the SPS either in discontinuous conduction mode (DCM) only, or in DCM mode with (or plus) additional power-savings by powering-OFF one or more sub-blocks 515) based on signal 543 (and SYNC signal (212)). In an embodiment, when SYNC signal (212) is a logic LOW and signal 543 is also a logic LOW, control block 520 operates the SPS in DCM mode only, i.e., with all of sub-blocks 515 ON and operative. However, when SYNC signal (212) is a logic LOW and signal 543 is a logic HIGH, control block 520 additionally powers-OFF some or all of sub-blocks 515.

As is well known in the relevant arts, when PWM (211) is logic HIGH, current flows from Vin to the load (connected to Va node, but not shown) via high-side switch and inductor (e.g., inductor 225A-1 associated with SPSA-1, 220-1) with rising slope. When PWM (211) is logic LOW, the inductor current flows in the loop formed by low-side switch, inductor 225A-1 and load with falling slope. In DCM, the inductor current is not allowed to go negative. A zero current detector (not shown in FIG. 5) is employed to turn OFF the low-side switch when the inductor current becomes zero. This avoids reversal of inductor current (negative current), which would otherwise pull current out of the load. DCM is used when the output load current is small (for example, when the power state is indicated to be PS3 in the illustrative embodiment) and improves the DC/DC efficiency at light loads, as is well known in the relevant arts. In CCM, the inductor current is allowed to go negative.

The description is continued to illustrate the manner in which a power stage operates in various power states according to aspects of the present disclosure.

8. Example Operation of Power Stage in Various Power States

As noted above, power stage 220 operates to identify a desired power state in which to drive a consumer component. In the illustrative embodiment, consumer component (CPU 120) is operable in any of power states listed in table 260 of FIG. 2A in a specified duration. It is assumed that initially the load current requirement of CPU 120 at node 240 (Va) is 45 A. As can be observed from row 271 of table 260 in FIG. 2B, the desired power state of CPU 120 is PS0. CPU 120 communicates the requirement to phase controller 220 via corresponding signal on path 121. Internal controller 410 of phase controller 220 determines that all 6 SPSes (SPS 220-1 through 220-6) of the 6-phase buck converter need to be enabled to meet the required load current. Accordingly, internal controller 410 employs all 6 phases (i.e., SPS 220-1 through 220-6) and provides corresponding PWM signals to each of the SPSes. Internal controller 410 keeps switches 435 and 445 in open state, and SYNC signal (212) is set to logic HIGH.

Control block 520 of each SPS (SPS 220-1 through 220-6) receives a respective PWM signal (211) and turns ON/OFF the high-side and low-side switches of the corresponding SPS for durations based on the received PWM signal. Since SYNC signal (212) received at pin 505 of each SPS (SPS 220-1 through 220-6) is logic HIGH, control block 520 of each SPS keeps switches 535 and 565 of the corresponding SPS in open state. Accordingly, no current is sourced at pin 505. Thus, output of comparator 543 is logic LOW.

After operating in PS0 power state for some time (e.g., a few minutes/hours), it is assumed that the load current requirement of CPU 120 at node 240 (Va) reduces to 15A. The desired power state is accordingly PS1 (row 272 of table 260 in FIG. 2B). CPU 120 communicates the requirement to phase controller 220 via corresponding signal on path 121. Internal controller 410 of phase controller 220 determines that 3 out of 6 SPSes need to be enabled to meet the required load current. Accordingly, internal controller 410 employs only 3 phases (e.g., SPS 220-1 through 220-3) and disables 3 phases (e.g., SPS 220-4 through SPS 220-6). Thus, internal controller 410 provides corresponding PWM signals to each of SPSes SPS 220-1 through 220-3, while internal controller 410 holds PWM signal in hi-Z state for a time interval exceeding the hold-off time ($T_h$) noted above for SPSes SPS 220-4 through 220-6. Internal controller 410 sets switches 435 and 445 in open state, and SYNC signal (212) is set to logic HIGH.

Control blocks 520 of SPSes 220-1 through 220-3 turn ON/OFF the high-side and low-side switches for corresponding durations based on the respective received PWM signal (211). Control blocks 520 of SPSes 220-4 through 220-6 turn OFF both high-side and low-side switches since PWM signal stays in hi-Z state for more than hold-off time ($T_h$).

Since SYNC signal (212) received at pin 505 is logic HIGH and PWM signal (211) is toggling (not hi-Z), respective control blocks 520 of SPSes 220-1 through 220-3 keep switches 535 and 565 in open state. Accordingly, no current is sent into path SYNC connected to pin 505. Thus, output of comparator 543 in each SPS 220 (SPS 220-1 through 220-3) is logic LOW. Respective control blocks 520 of SPSes 220-1 through 220-3, therefore, operate corresponding SPSes in CCM.

Since SYNC signal (212) received at pin 505 is logic HIGH and PWM signal (211) is hi-Z for SPSes 220-4 through 220-6, respective control blocks 520 of SPSes 220-4 through 220-6 keep switches 535 and 565 in open state.

After operating in PS1 power state for some time (e.g., a few minutes/hours), it is assumed that the load current requirement of CPU 120 at node 240 (Va) reduces to 3 A. The desired power state is accordingly PS2 (row 273 of table 260 in FIG. 2B). CPU 120 communicates the requirement to phase controller 220 via corresponding signal on path 121. Internal controller 410 of phase controller 220 determines that only 1 phase out of 6 SPSes (220-1 through 220-6) needs to be enabled to meet the required load current. Accordingly, internal controller 410 employs only 1 phase (e.g., SPS 220-6) and disables 5 phases (e.g., SPS 220-1 through SPS 220-5). Thus, internal controller 410 provides corresponding PWM signals to SPS 220-6, while internal controller 410 holds PWM signal in hi-Z state for a time interval exceeding the hold-off time ($T_h$) noted above for each of SPSes 220-1 through 220-5. Internal controller 410 closes switch 435 and continues to keep switch 445 in open state, and SYNC signal (212) is set to logic LOW. Thus, impedance network 420 provides resistance 455 (R1) at pin 405 in PS2 power state.

As noted above with respect to PS1 state, control blocks 520 of SPSes 220-1 through 220-5 turn OFF both high-side and low-side switches (since PWM is in hi-Z for time interval exceeding hold-off time, Th).

For SPS-6, since logic LOW is received on path 212 (SYNC) and PWM (211) is not in hi-Z, control block 520 of SPS-6 closes switches 535 and 565, and opens switches 545, 542 and 555. Accordingly, a current of 10 micro-A is driven into pin 505. Since impedance network 420 of phase controller 210 has been configured to provide resistance R1 (=100 Ohms) in high-power state (PS2), voltage sensed at pin 505 will be:

$$V=I*R=10\ micro\text{-}A*100\ Ohms=1\ milli\text{-}Volt.$$

Thus, inputs to comparator 540 of SPS 220-6 are 1 milli-V (V1) and 150 milli-V (V2). Output 543 of comparator 540 is accordingly logic LOW. Control block 520 operates SPS-6 in DCM but does not turn OFF any of sub-blocks 515.

After operating in PS2 power state for some time (e.g., a few minutes/hours), it is assumed that the load current requirement of CPU 120 at node 240 (Va) reduces to 0.5 A. In other words, CPU 120 transitions to an idle mode. The desired power state is accordingly PS3 (row 274 of table 260 in FIG. 2B). Based on corresponding signal 121 received from CPU 120, internal controller 410 determines that SPS 220-6 is the only phase that needs to be employed. Since internal controller 410 determines the desired power state to be low-power state (PS3), internal controller 410 closes switch 445 and opens switch 435, and SYNC signal (212) is set to logic LOW. Thus, impedance network 420 provides resistance 465 (R2) at pin 405 in low-power state.

As noted above with respect to PS1 state, control blocks 520 of SPSes 220-1 through 220-5 turn OFF both high-side and low-side switches (since PWM is in hi-Z for time interval exceeding hold-off time, $T_h$).

For SPS-6, since logic LOW is received on path 212 (SYNC) and PWM (211) is not in hi-Z, control block 520 of SPS-6 closes switches 535 and 545, and opens switches 555 and 565. Accordingly, a current of 10 micro-A is sourced at pin 505. Since impedance network 420 of phase controller 210 has been configured to provide resistance R2 (=25 Kilo-Ohms), voltage sensed at pin 505 will be:

$$V=I*R=10\ micro\text{-}A*25\ Kilo\text{-}Ohms=250\ milli\text{-}V.$$

Thus, inputs to comparator 540 of SPS 220-6 are 250 milli-V (V1) and 150 milli-V (V2). Output 543 of comparator 540 is accordingly logic HIGH. Control block 520 continues to operate SPS-6 in DCM. In addition, in an embodiment, control block 520 turns OFF sub-block 515-1 (i.e., sub-block 515-1 does not consume any power from the respective power sources) and keeps sub-block 515-2 ON (i.e., sub-block 515-2 continues to operate normally and consumes the requisite power from the respective power sources). In alternative embodiments, control block 520 may turn OFF sub-blocks 515-1 as well as 515-2 in order to enhance power saving.

Thus, aspects of the present disclosure provide for communicating a low-power state to a power stage without additional pin/interface between phase controller 210 and each SPS. Based on such communication, an SPS 220 may enhance power saving within the power supply in the low-power state by operating in DCM, and additionally turning OFF one or more components (sub-blocks) of internal block in the SPS. It may be appreciated that by operating in DCM, power stage SPS 220 reduces static current/quiescent current, and thus consumes as little power as possible, thereby enhancing power saving in low-power state.

Although the illustrative embodiment describes a sequential transition between power states (PS0 to PS1 to PS2 and so on) for ease of understanding, in practice, transitions between power states may not be sequential (e.g., PS0 to PS3 to PS2 is a possible transition), as will be apparent to a skilled practitioner. Accordingly, phase controller 210 may determine number of phases to be employed, and may generate corresponding PWM signals.

In addition, while the embodiments of above are described with respect to resistance network as an impedance network and electric current being sourced to sense responsive voltage, it must be appreciated alternative embodiments can be implemented with alternative impedance networks of diverse impedance components (e.g., resistors, capacitors), and corresponding suitable electric energy may be sourced (applied) to responsive signals, without departing from the scope and spirit of the present invention, as will be apparent to a skilled practitioner by reading the disclosure provided herein.

In this manner, aspects of the present disclosure provide a technique for detecting a desired power state, and provide power saving in a power stage of a multi-phase voltage regulator operative in low-power state.

9. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2A, 4 and 5, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors will be apparent to one skilled in the relevant arts by reading the disclosure provided herein. For example, the NMOS transistors may be replaced with PMOS (P-type MOS) transistors, while also interchanging the connections to power and ground terminals.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A power supply to drive a consumer component operable in any one of a plurality of power states, said power supply comprising:
   a power stage to drive said consumer component to a desired power state of said plurality of power states; and
   a phase controller to control the power stage to cause said power stage to drive said consumer component to said desired power state, wherein said phase controller comprises:
      a pin;
      an impedance network configurable to provide at said pin a first impedance when said desired power state is a first power state and a second impedance when said desired power state is a second power state; and
      an internal controller to configure said impedance network to provide said first impedance at said pin when said desired power state is said first power state, and said second impedance at said pin when said desired power state is said second power state,
   wherein said power stage is designed to source an electrical current to said pin and sense the corresponding electrical voltage at said pin, wherein said power stage examines a magnitude of said sensed electrical voltage to determine whether said desired power state is said first power state or said second power state.

2. The power supply of claim 1, wherein said impedance network comprises:
   a plurality of resistors having different magnitudes of resistances; and
   a plurality of switches, with each switch designed to couple a respective resistor of said plurality of resistors to said pin,
   wherein said internal controller operates said plurality of switches to couple one of said resistors to said pin, wherein a magnitude of resistance of the coupled resistor determines said magnitude of sensed electrical voltage to indicate the corresponding specific one of said plurality of power states being provided as said desired power state.

3. The power supply of claim 1, wherein said plurality of power states comprise at least four states including a highest power state, a high-power state, a low-power state and a shut down power state in decreasing order of power levels,
   wherein said first power state is said high-power state and said second power state is said low-power state.

4. The power supply of claim 3, wherein said power stage comprises:
   a control block to determine whether said desired power state is said high-power state or said low-power state; and
   an internal block comprising one or more circuit portions, wherein said control block powers OFF said one or more circuit portions of said internal block when said desired power state is determined to be said low-power state.

5. The power supply of claim 4, wherein said control block operates said power stage in one of a continuous conduction mode (CCM) only and a discontinuous conduction mode (DCM) only when said desired power state is determined to be said high-power state.

6. The power supply of claim 5, wherein said power stage determines said desired power state as said low-power state when said electrical voltage exceeds a predetermined threshold, and as said high-power state otherwise.

7. The power supply of claim 6, wherein said power stage comprises a comparator coupled to receive said sensed voltage and said threshold voltage, said comparator to generate a result signal as a comparison result of said sensed voltage and said threshold voltage, wherein said control block is coupled to receive said result signal.

8. The power supply of claim 7, wherein said power stage comprises a first switch, a current source and a second switch, wherein said first switch is coupled between said pin and said constant reference potential and said second switch is coupled between said threshold voltage and said comparator input, wherein said control block operates to close said first switch and said second switch when said desired power state is said first power state or said second power state.

9. A method performed in a power supply for driving a consumer component, said method comprising:

identifying, by a phase controller of said power supply, a power state of a plurality of power states in which to drive said consumer component;

setting, by said phase controller, an impedance level of an impedance network located internal to said phase controller, to provide an impedance corresponding to said power state at a pin of said phase controller, wherein said phase controller provides at said pin a first impedance when said desired power state is a first power state and a second impedance when said desired power state is a second power state, wherein a power stage of said power supply determines said desired power state based on a magnitude of said impedance level by:

sourcing an electrical current on said pin to said phase controller;

sensing an electrical voltage in response to said sourcing; and determining that said power stage is being driven to operate in said first power state or second power state by examining a magnitude of said sensed voltage; and driving said consumer component in said power state.

10. The method of claim 9, wherein said impedance network comprises a plurality of resistors having different magnitudes of resistances and a plurality of switches, with each switch designed to couple a respective resistor of said plurality of resistors to said pin, wherein said phase controller operates said plurality of switches to couple one of said resistors to said pin, wherein a magnitude of resistance of the coupled resistor determines said magnitude of sensed electrical voltage to indicate the corresponding specific one of said plurality of power states being provided as said desired power state.

11. The method of claim 9, wherein said plurality of power states comprise at least four states including a highest power state, a high-power state, a low-power state and a shut down power state in decreasing order of power levels, wherein said first power state is said high-power state and said second power state is said low-power state.

12. The method of claim 11, wherein said power stage comprises:

a control block to determine whether said desired power state is said high-power state or said low-power state; and an internal block comprising one or more circuit portions, wherein said control block powers OFF said one or more circuit portions of said internal block when said desired power state is determined to be said low-power state.

13. The method of claim 12, wherein said control block operates said power stage in DCM and additionally powers OFF said one or more circuit portions of said internal block when said desired power state is said low-power state.

14. The method of claim 13, wherein said power stage determines said operative power state as said low-power state when said sensed voltage exceeds a predetermined threshold, and as said high-power state otherwise.

15. A multi-phase voltage regulator comprising:

a phase controller comprising:

means for identifying a power state of a plurality of power states in which to drive a consumer component;

means for setting an impedance level of an impedance network to provide an impedance corresponding to said power state; and means for providing said impedance at a pin of said phase controller, wherein said phase controller provides a first impedance when said desired power state is a first power state and a second impedance when said desired power state is a second power state; and a power stage to determine said desired power state based on a magnitude of said impedance level, wherein said power stage comprises:

means for sourcing an electrical current on said pin to said phase controller;

means for sensing an electrical voltage in response to said sourcing;

means for determining that said power stage is being driven to operate in said first power state or second power state by examining a magnitude of said sensed voltage; and means for driving said consumer component in said power state.

16. The multi-phase voltage regulator of claim 15, wherein said impedance network comprises a plurality of resistors having different magnitudes of resistances and a plurality of switches, with each switch designed to couple a respective resistor of said plurality of resistors to said pin, wherein said phase controller comprises means for operating said plurality of switches to couple one of said resistors to said pin, wherein a magnitude of resistance of the coupled resistor determines said magnitude of sensed electrical voltage to indicate the corresponding specific one of said plurality of power states being provided as said desired power state.

17. The multi-phase voltage regulator of claim 16, wherein said plurality of power states comprise at least four states including a highest power state, a high-power state, a low-power state and a shut down power state in decreasing order of power levels, wherein said first power state is said high-power state and said second power state is said low-power state.

18. The multi-phase voltage regulator of claim 17, wherein said power stage determines said identified power state as low-power state when said sensed voltage exceeds a predetermined threshold, and as said high-power state otherwise.

19. The multi-phase voltage regulator of claim 18, wherein said power stage comprises an internal block having one or more circuit portions, wherein said multi-phase voltage regulator further comprises:

means for determining whether said desired power state is said high-power state or said low-power state; and means for powering OFF said one or more circuit portions of said internal block when said desired power state is said low-power state.

20. The multi-phase voltage regulator of claim 19, wherein said multi-phase voltage regulator further comprises:

means for operating said power stage in a discontinuous conduction mode (DCM) only when said desired power state is said high-power state.

* * * * *